(12) United States Patent
Carcarino

(10) Patent No.: US 6,244,083 B1
(45) Date of Patent: Jun. 12, 2001

(54) ANTI-THEFT DEVICE FOR VEHICLES WITH TWIST GRIP THROTTLE CONTROL

(75) Inventor: Rosario Salvatore Carcarino, Naples (IT)

(73) Assignee: ADFRA S.r.l., Ravenna (IT)

( * ) Notice: Subject to any disclaimer, the term of this patent is extended or adjusted under 35 U.S.C. 154(b) by 0 days.

(21) Appl. No.: 09/319,650

(22) PCT Filed: Dec. 8, 1997

(86) PCT No.: PCT/IB97/01540

§ 371 Date: Jun. 10, 1999

§ 102(e) Date: Jun. 10, 1999

(87) PCT Pub. No.: WO98/25812

PCT Pub. Date: Jun. 18, 1998

(30) Foreign Application Priority Data

Dec. 12, 1996 (IT) ............................................. MI96A2605
May 30, 1997 (IT) ............................................. RM97A0323

(51) Int. Cl.[7] .................................................. B60R 25/04
(52) U.S. Cl. ............................ 70/242; 70/209; 180/114
(58) Field of Search .............................. 70/182–186, 207, 70/210, 211, 233, 237, 242, 252; 180/114

(56) References Cited

U.S. PATENT DOCUMENTS 4,133,193 * 1/1979 Sanada et al. ...................... 70/242 X
4,881,389 * 11/1989 Alfon et al. ............................ 70/209

FOREIGN PATENT DOCUMENTS

1132662 * 3/1957 (FR) .
2598995 * 11/1987 (FR) .

* cited by examiner

*Primary Examiner*—Suzanne Dino Barrett
(74) *Attorney, Agent, or Firm*—Fay, Sharpe, Fagan, Minnich & McKee, LLP

(57) ABSTRACT

The present invention relates to an anti-theft device for scooters, motorvehicles, snowmobiles, outboard motors, helicopters and other vehicles provided with a fuel control twist grip, which affects the fuel control twist grip. This twist grip is realised in two co-axial consecutive parts, which can be rigidly coupled together, of which the first part is a removable tubular element (1; 501), covered on the outside with an integral grip (10) and the second part is a non-removable tubular element (2; 200; 502), present in the handlebar and engaged with flexible transmission means of the fuel supply control. There are also engagement means (3; 503, 504) between the removable tubular element (1; 501) and the non-removable tubular element (2; 200; 502); and a locking block (4) to close the non-removable tubular element (2; 200) when the removable tubular element (1) has been disengaged and removed or the removable tubular element (501) is replaced by another tubular element (515), missing of the engagement means (503), so that said element (515) freely rotates without affecting the fuel supply control.

24 Claims, 6 Drawing Sheets

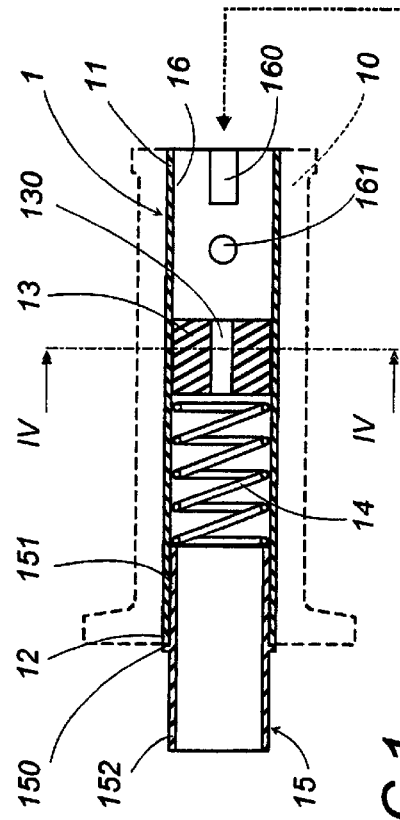

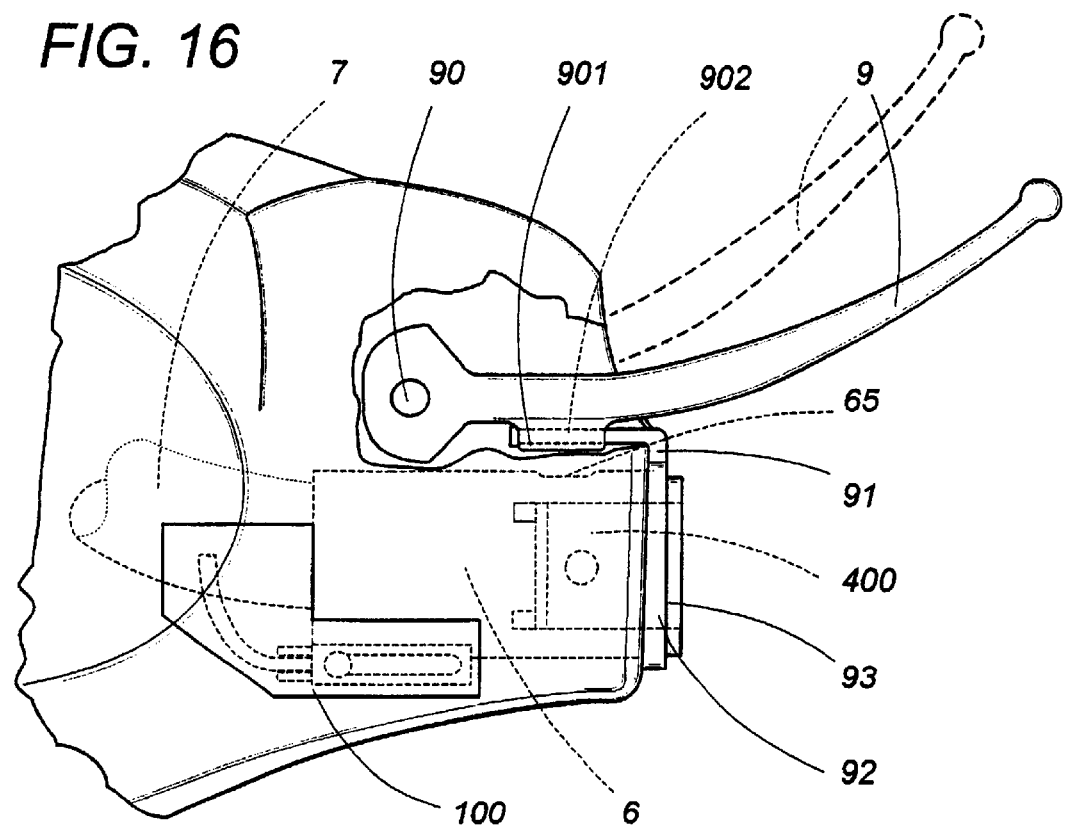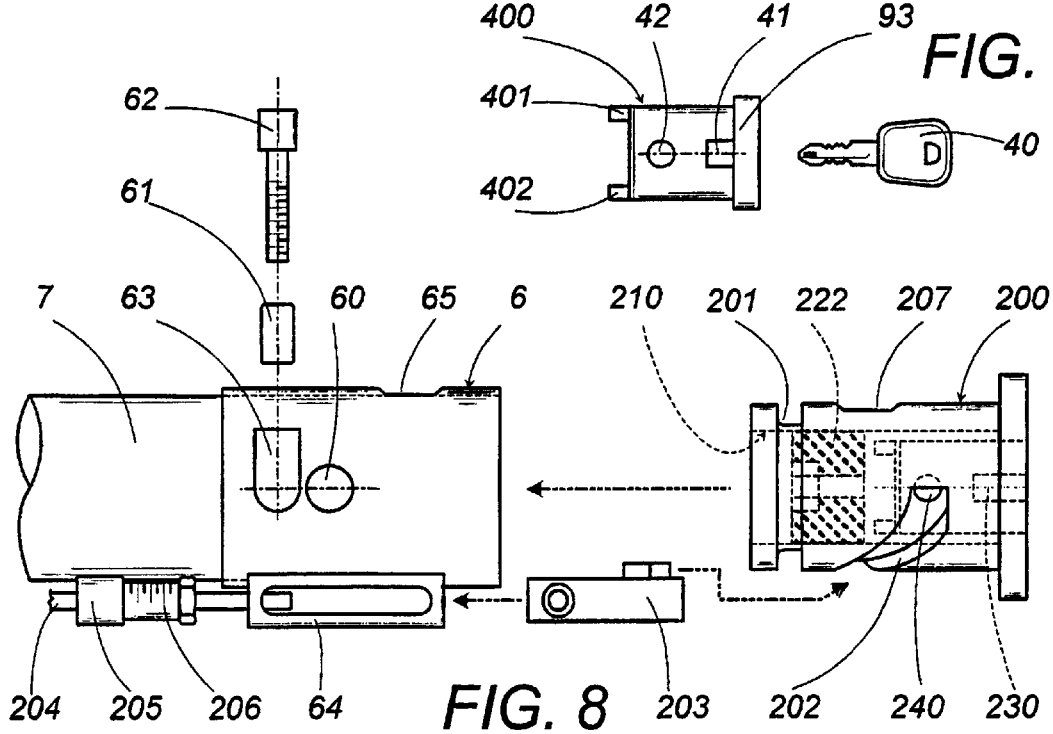

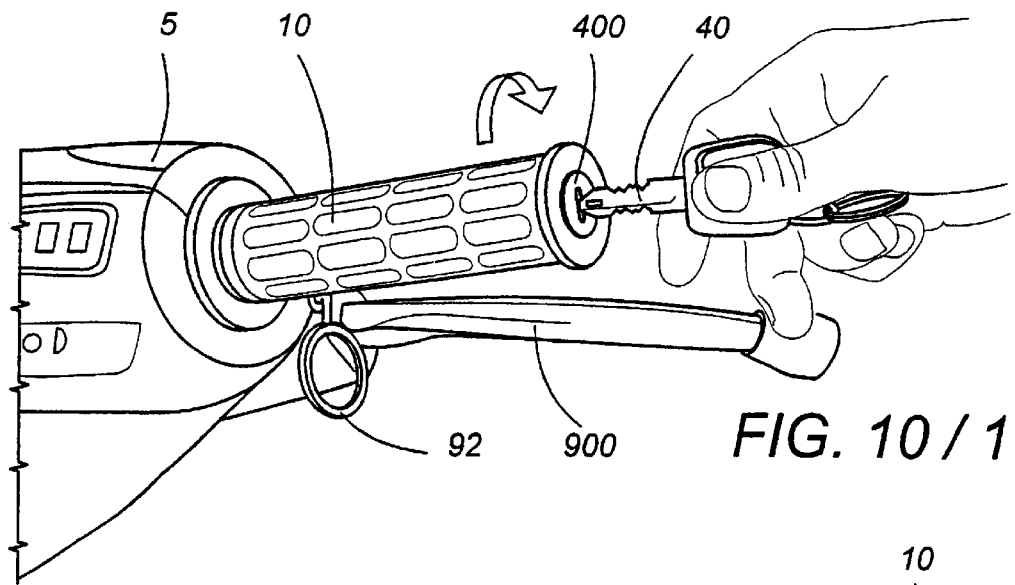
FIG. 10 / 1
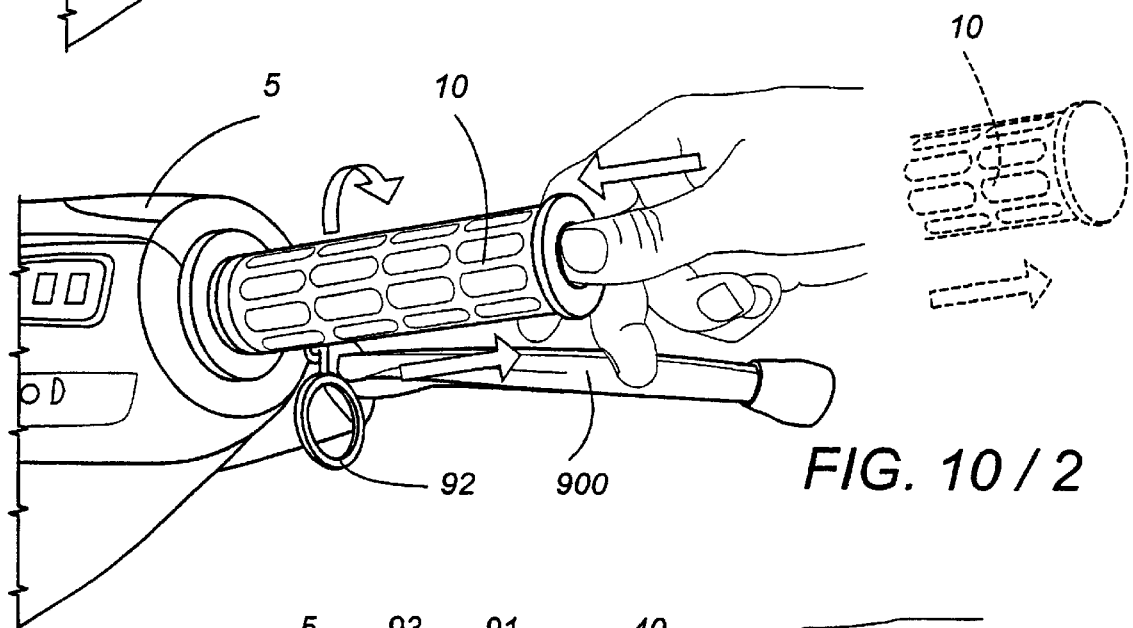
FIG. 10 / 2
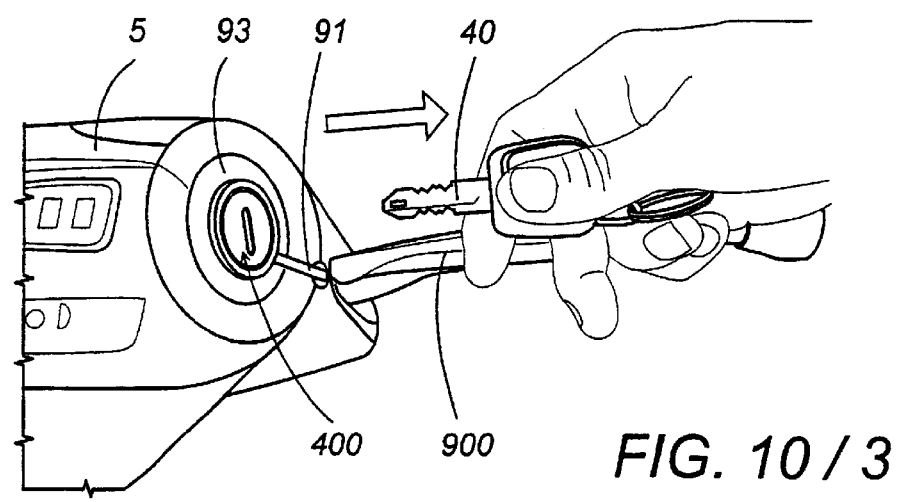
FIG. 10 / 3

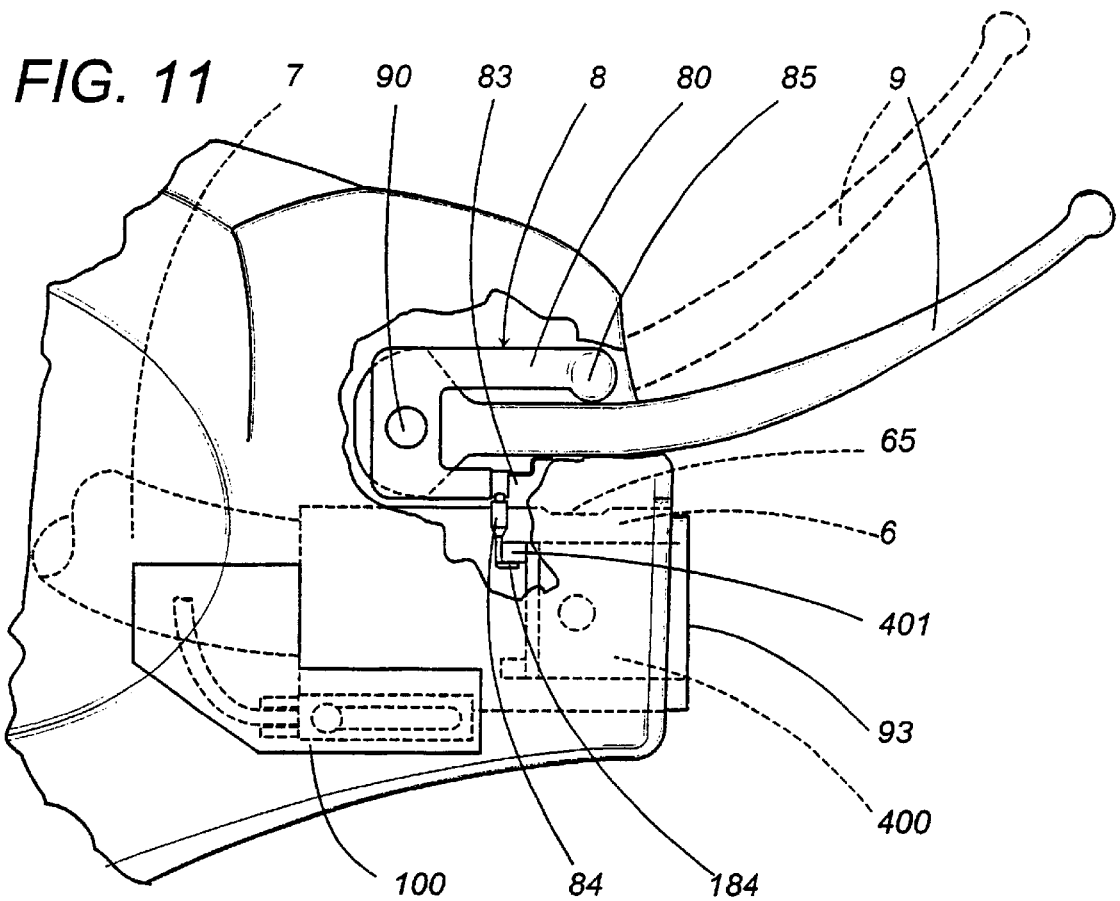
FIG. 11
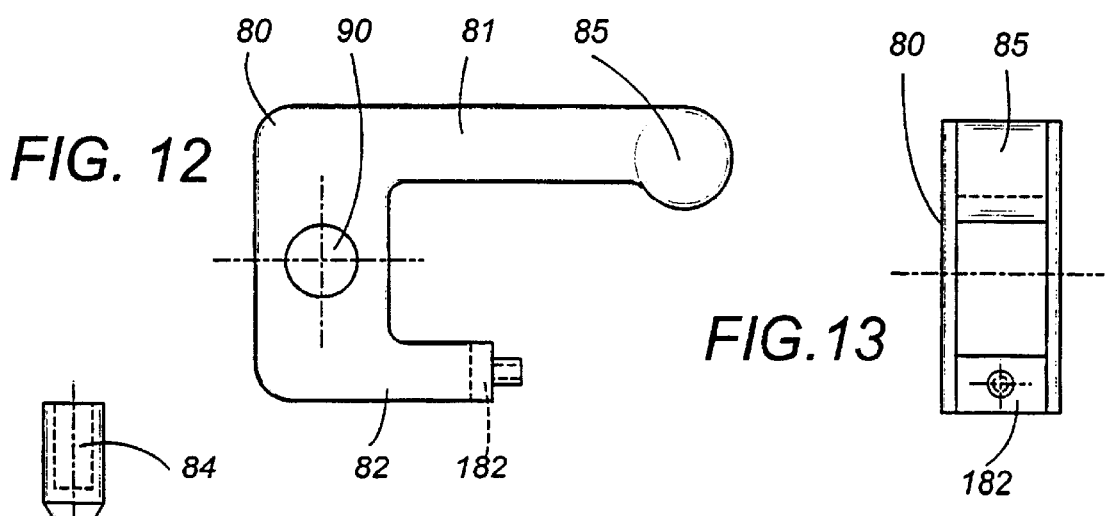
FIG. 12
FIG. 13
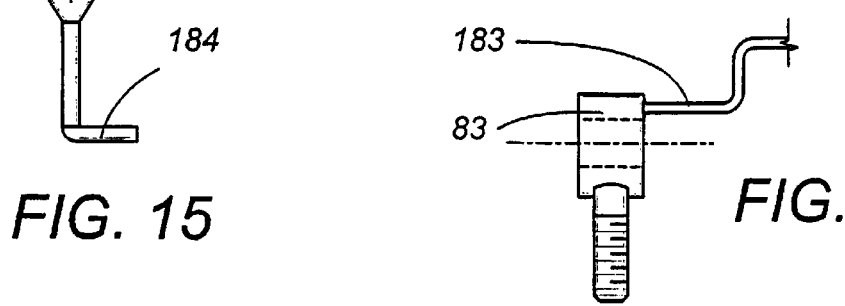
FIG. 15
FIG. 14

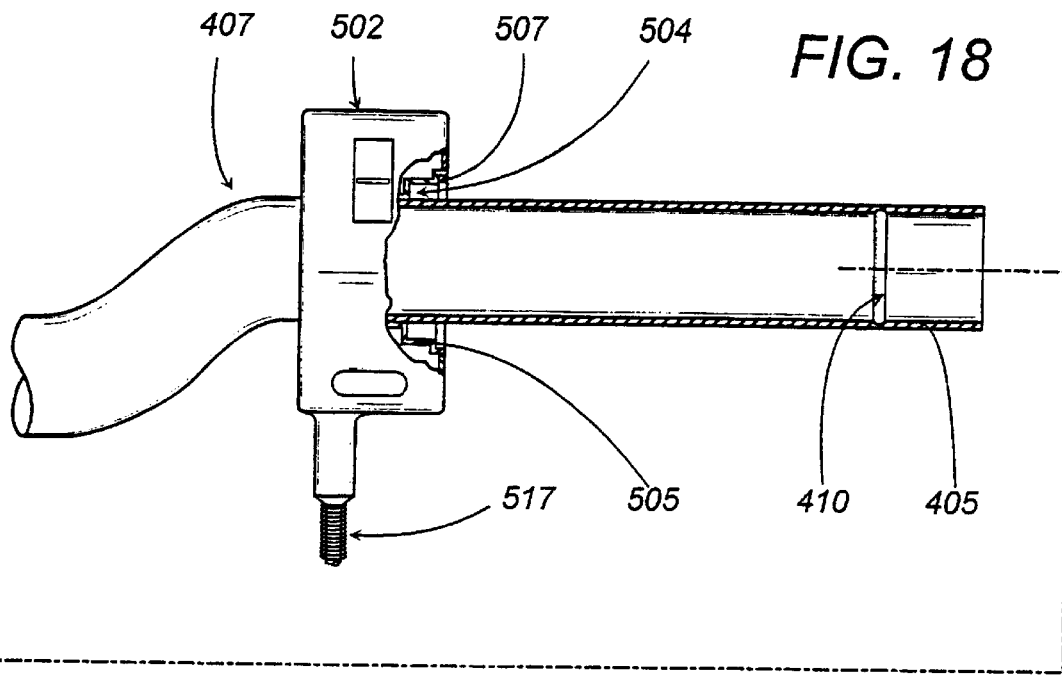
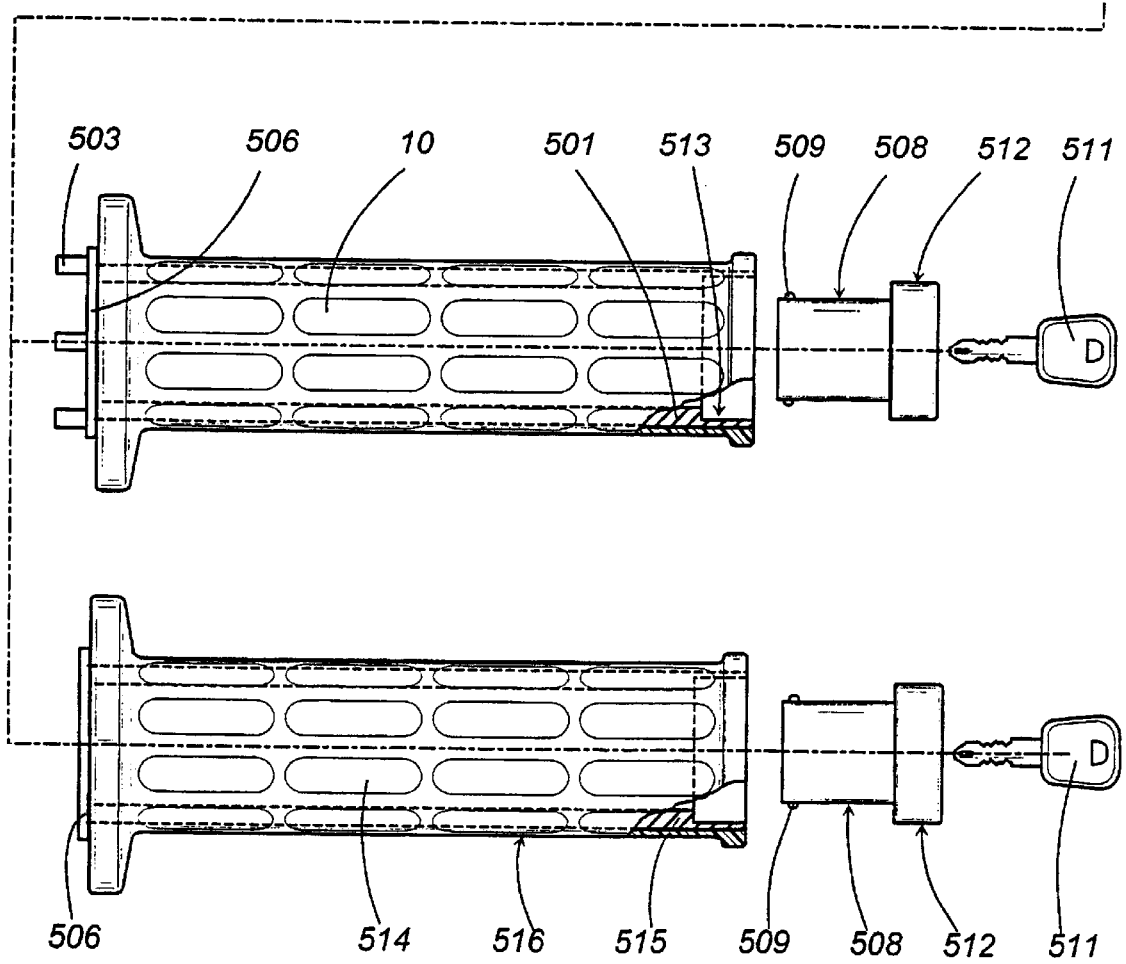
FIG. 18

ANTI-THEFT DEVICE FOR VEHICLES WITH TWIST GRIP THROTTLE CONTROL

TECHNICAL FIELD

The present invention relates to an anti-theft device for scooters, motorvehicles, snowmobiles, outboard motors, helicopters and other vehicles provided with a fuel control twist grip, which affects the fuel control twist grip, or the twist grip otherwise known as the accelerator twist grip.

BACKGROUND ART

Up to now, the fuel control twist grip of a scooter or similar vehicle has always been manufactured in a single piece, covered, on the outside, with a rubber or similar grip, for secure gripping on the part of the driver, and connected, in the part facing the handlebar, with flexible transmission means connected to the carburettor and supported in the handlebar by a tubular support element at the end of which the fuel control twist grip is usually located.

All anti-theft devices up to now designed for and applied to scooters or motorvehicles in general, have been designed to control the possibility of manoeuvring and turning the handlebar around the steering axis or on the electrical power supply to the motor. These types of anti-theft device have proved to be quite inefficient, since they can easily be overcome.

Another type of anti-theft device in use is that which uses mechanical means for blocking the wheel(s), or again the handlebar, in the form of chains or rigid shackle-type locks which are fitted with suitable safety locks. This type of anti-theft device has demonstrated greater resistance to braking or cutting, but still relies on a lock which can be broken and is awkward and inconvenient to carry around and to apply.

Still another type of anti-theft device disclosed in the French patent FR-A-1 132 662 and in the French patent application FR-A-2 598 995 comprises a lock co-axially disposed inside the fuel control twist grip and capable of blocking the rotation of the twist grip by making the twist grip coupled to the handlebar of the motorvehicle. However, also this type of anti-theft device relies on the lock which can be broken.

DISCLOSURE OF THE INVENTION

The main aim of the present invention is to manufacture an anti-theft device which involves the removal of an essential element required for starting up and running the motorvehicle, not easily replaced with other means, which is easy and quick to remove and re-fit and, therefore, to use.

The innovative idea on which the present invention is based, therefore, is to manufacture a fuel control twist grip for a scooter or similar motorvehicle in two separate parts to create an anti-theft device which affects the fuel control twist grip which involves its physical release and removal from the handlebar of the motorvehicle.

The innovative idea also includes the creation of a system for closing and therefore blocking access to the flexible transmission elements of the fuel control in the body of the handlebar.

Another aim of the present invention is to create an anti-theft mechanism, of the type indicated above, with which it is also possible to block the brake lever, for the cases in which it is present, said brake lever being functionally associated to the handlebar on the same side as the said fuel control twist grip, to provide further protection against theft.

The invention, which is characterised by the claims which follow, solves the problem of providing an anti-theft device for scooters, or other motorvehicles, which affects the fuel control twist grip, which, from a general point of view, is characterised in that the said twist grip is manufactured in two co-axial consecutive parts which can be rigidly coupled together, of which the first part is a removable tubular element (preferably covered on the outside with an integral grip) and the second part is a non-removable tubular element, present in the handlebar and held by the flexible transmission means of the fuel supply control; this involves engagement means between the said removable tubular element and the said non-removable tubular element and a closing locking block for the non-removable tubular element when the said removable tubular element is disengaged and removed.

Advantageously, the said non-removable tubular element is fitted with a through hole for a connecting arm of a mechanism that blocks the brake lever, which is found on the same side as the said twist grip, in the braking position.

From the conceptual point of view, the anti-theft device described above is manufactured by cutting the conventional fuel control twist grip in two pieces, without in any other way modifying the flexible transmission of the control itself, or any other type of acceleration control for a motorvehicle. Therefore, the anti-theft device described by this invention may be supplied in a kit for modifying scooters which have already been manufactured or can be fitted to new scooters.

Other characteristics and advantages of the present invention are included in the detailed description which follows, are a preferred embodiment, which is purely illustrative and not in any way binding in relation to the drawings, in which:

FIG. 1 is a lengthways axial view, partly exploded, of the removable tubular element with means which engage with the fuel control twist grip according to the present invention;

FIGS. 2, 3, and 4 show cross sections along the lines II—II, I—I and III—III and, respectively, IV—IV of FIG. 1;

FIG. 5 is a lengthways axial view of the non-removable tubular element for a fuel control twist grip according to a first application of the present invention;

FIG. 6 shows a cross section along the line V—V of FIG. 5;

FIG. 7 is a side view of a cylindrical locking block for a first application of the present invention;

FIG. 8 is an exploded side view of the non-removable tubular element for a fuel control twist grip conforming with a second application of the present invention;

FIG. 9 is a side view of a cylindrical locking block for a second application of present invention;

Figure 17:
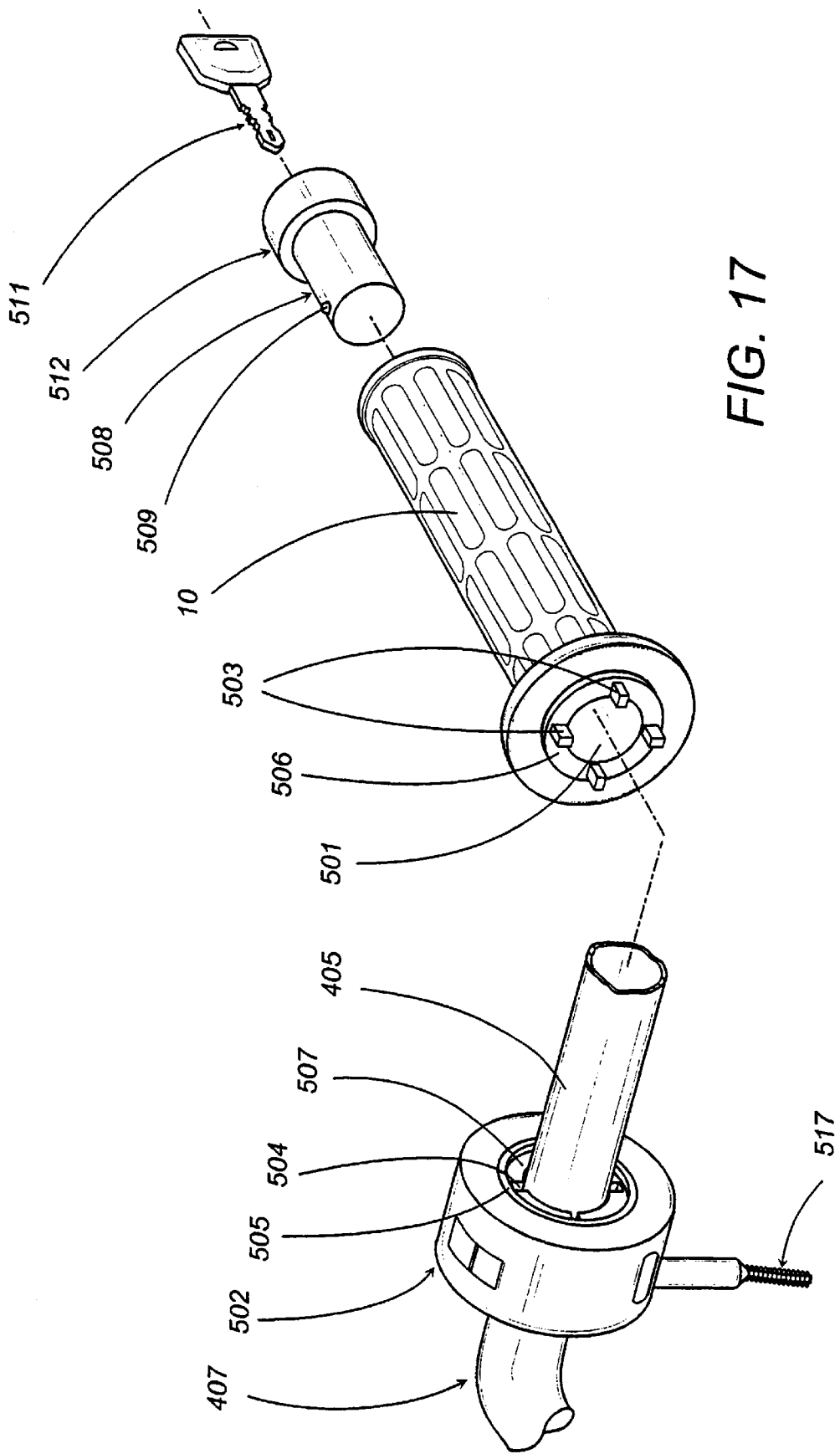

FIGS. 10/1, 10/2 and 10/3 are schematic perspective views of the fuel control twist grip according to the present invention, functioning on the handlebar of a scooter;

FIG. 11 is a schematic view from above, partly cut away, of a non-removable tubular element fitted with a locking block and a first form of mechanism for blocking the brake lever according to the present invention;

FIGS. 12 and 13 show a view from above and, respectively, a view of the end part, of a connection lever of the blocking mechanism for the brake lever shown in FIG. 11;

FIGS. 14 and 15 show a side view of two parts of the blocking mechanism of the brake lever shown in FIG. 11;

FIG. 16 is a schematic view from above, partly cut away, of a non-removable tubular element fitted with a locking block and a second form of mechanism for blocking the brake lever according to the present invention;

FIG. 17 is a schematic perspective view of the fuel control twist grip according to another embodiment of the present invention, functioning on a motorcycle; and FIG. 18 is a lengthways axial view of the fuel control twist grip according to the embodiment of FIG. 17.

In compliance with the present invention, in FIGS. 1 to 10, 1 indicates a removable tubular element and 2 and 200, in two different applications, indicate a non-removable tubular element of a fuel control twist grip which together form the anti-theft device subject of the present invention, 3 indicates engagement means and 4 and 400 indicate a cylindrical locking block.

With reference to FIGS. 1 to 4 and 10/1, 10/2 and 10/3, the removable tubular element 1 is preferably covered on the outside with a grip 10 (represented with the dashed line in FIG. 1). Again, with reference to FIG. 1, the removable tubular element 1 has a right end part 11 facing outwards, and a left end part 12 facing the handlebar 5, that it will be engaged to by means of the non-removable tubular element 2 and 200, according to the different applications, as seen below.

The removable tubular element 1 includes, on the inside, starting from the end part 11 to the opposite end part 12, a cylindrical guide 13, integral or at least firmly coupled to an antagonist spring 14 and a fitting sleeve 15. The fitting sleeve 15 has a raised circumference 150, which divides a portion 151 which is integral or firmly coupled to the end part of the removable tubular element 1 and a portion 152 which will be inserted with a sliding coupling and engaged in the outer end part of the non-removable tubular element 2 or 200. The guide 13, the spring 14 and the fitting sleeve 15 work together with a shaped rod 30 for axial sliding with manual operation.

The shaped rod 30 has, from the end part facing the non-removable tubular element to the opposite end part, an enlarged end 31, a stem 32, a stop disk 33, an enlarged part 34 and a push head 35.

The stem 32 is cylindrical (FIG. 2), while the enlarged end 31 and the enlarged part 34 of the shaped rod 30 have a non-circular cross section, which is preferably elliptical, as shown in FIG. 3 or otherwise. Clearly, the enlarged end 31 and the enlarged part 34 of the shaped rod 30 may have different cross sections from each other. The non-circular section allows the shaped rod to slide without turning in a lengthways hole of the same shape 130 of the guide 13. The cylindrical stem 32 has a diameter equal to the smaller diameter of the elliptical cross section of the enlarged end 31 and the enlarged part 34. The outer diameter of the stop disk 33 and the push head 35 is just smaller than the inner diameter of the removable tubular element 1, so that the shaped rod 30 can slide inside it.

The shaped rod 30 is inserted, co-axially, inside the removable tubular element 1, rotated by 90° compared to the representation in FIG. 1, so that the enlarged part 34 slides inside the guide 13. The crossways stop disk 33 is therefore integral with, splined or welded to the cylindrical stem 32. The spring 14 rests against the stop disk 33; for example, a helical spring, with the other end part resting against the fitting sleeve 15. As explained in greater detail below, with this layout, the shaped rod 30 moves axially inside the removable tubular element 1, without the possibility of turning or escaping. In fact, when pushed axially by hand (FIG. 10/2), the push head 35 is moved to the left (FIG. 1) until it rests against the guide 13, and, vice versa, when it is no longer pushed axially, thanks to the antagonistic force of the spring 14, the shaped rod 30 moves to the right until the stop disk 33 is against the face of the same guide 13.

The non-removable tubular element is present in the handlebar and is connected with a rotating connection to the body of the handlebar. As discussed above, currently the non-removable tubular element is present in the handlebar, but in a single piece with the part which covers the grip of the fuel control twist grip.

In a first application (FIG. 5), the flexible transmission means of the fuel supply control include, as known, a sheave, illustrated with dashed lines and marked with 20. The non-removable tubular element is indicated with 2 and it is used to turn and pull with it, the said sheave 20 thus controlling the flexible transmission.

In a second application (FIG. 8), in which the non-removable tubular element is indicated with 200, the flexible transmission means of the fuel supply control include, as known, a hollow cylindrical body 6, co-axially surrounding the non-removable tubular element 200. The non-removable tubular element 200 has a revolving engagement with the hollow cylindrical body 6 by means of a screw (not shown) passing through a hole 60 in a groove 201 on the outer circumference of the same non-removable tubular element. The hollow cylindrical body 6 may be rigidly connected to the tube 7 of the handlebar 5 of the scooter by means of a bushing 61 and a screw 62, screwed into a housing 63 on the circumference of the body 6, or by means of any other coupling means. The body 6 is fitted on the outside with a lengthways prismatic guide 64. The non-removable tubular element 200 is fitted with a spiral groove 202 for the sliding of a slider 203. Again, as known, the slider 203 is integral with the end part of the fuel control flexible transmission cable 204, located in the relative sleeve 205 fitted with a tensioner 206 and moves in the lengthways guide 64 of the hollow cylindrical body 6. Advantageously, to prevent possible theft, the lengthways guide 64 and the relative flexible transmission are protected with a cover 100 (FIGS. 11, 16), fixed with the relative counter-plate (not shown) to the hollow cylindrical body 6 and the relative end part of the handlebar tube 7.

According to the present invention, both in the first and in the second application described above with reference to FIGS. 5 and 8, the non-removable tubular element 2, 200 has, on the inside, near the free end part, facing the removable tubular element 1, a cylindrical space 21, 210 for the locking block 4, and adjacent to it, an engagement bushing 22, 222, integral with the non-removable tubular element 2.

In the space 21, 210 of the non-removable tubular element 2, 200, there is a lengthways groove 23, 230 and a diametrical through hole 24, 240.

The bushing 22, 222, as illustrated in greater detail in FIG. 6, has, in its centre, a through cavity 25 shaped in the first section 26 to match the enlarged end 31 of the shaped rod 30, and shaped, in the second section 27, to match the combination of the first section 26, and an equal hollow section rotated by a set angle (for example, 900 as in FIG. 6). In this way, the symmetry planes of the two sections of the cavity are matching and at right angles to each other.

Therefore, while the first section 26 of the cavity 25 is designed to guide the enlarged end 31 of the shaped rod 30 through it, the second section 27 is used to form a restraining shoulder for the same enlarged end 31 once it has passed the first section 26 and has been rotated by the set angle, to engage it in the cavity at right angles to it.

Even if only two applications of the non-removable tubular element 2, 200 according to the present invention have been illustrated, this does not exclude the possibility that it can be applied to other fuel control twist grips, currently known or yet to be designed. In the same way, the present anti-theft device is not only limited to fuel control twist grips for carburettor fuel supply but may be used for injection fuel supply control twist grips.

With reference to FIG. 7, the locking block 4 is shown for a first application of the present invention. It is represented schematically as a conventional cylindrical lock with relative key 40, of a commercial type. The locking block 4, however, may be of a different type, for example, a lock operated by a key with a tubular body with teeth on the end part.

The locking block 4 illustrated has a lengthways check lip 41. When the locking block 4 is inserted in the cylindrical space 21, 210 of the non-removable tubular element 2, 200, the check lip 41 fits into the lengthways guide groove 23, 230 of the same space. The locking block 4 has a pin 42 which pops out when the key 40 is turned, destined to fit into the diametrical through hole 24, 240 of the space 21, 210. Note that blocking with the pin of the locking block 4 is purely illustrative and other blocking means and methods may be used, if a different locking block is used.

As described previously, from the functional point of view, the shaped rod 30 with its enlarged end 31 held in the second section 27 of the engagement bushing 22, 222 allows the twist grip 10 of the integral removable tubular element 1, that is, therefore, rigidly connected to the non-removable tubular element 2, 200, to be turned and therefore control the fuel control flexible transmission. The connection between the engagement bushing 22, 222 and the enlarged end 31 of the shaped rod 30 remains stable regardless of the position of the twist grip 10 when operating the accelerator.

When the driver stops the scooter and parks it, he can use the anti-theft device according to the present invention, as shown in its operating sequence in FIGS. 10/1, 10/2 and 10/3 and structurally in FIGS. 1 and 5, in relation to the various uses described below in detail. The driver applies manual axial pressure to the shaped rod 30 using the push head 35, so that its enlarged end 31 passes through the restraining section 27 of the cavity 25 of the engagement bushing 22, 222. Maintaining this axial pressure applied to the shaped rod 30, the driver turns the twist grip 10 and then the integral removable tubular element 1 and the shaped rod 30 by the set angle, 90° in this embodiment, so that the enlarged end 31 of the shaped rod 30 is positioned in correspondence with the first section 26 of the cavity 25 of the engagement bushing 22, 222. At this point, by removing the axial pressure from the push head 35, the enlarged end 31 of the shaped rod 30 passes through the first section 26 of the cavity 25, and comes out of the engagement bushing 22, 222. The twist grip 10, together with the removable tubular element 1 and the shaper rod 30 connected to it, can be removed, to be taken away by the driver, or, more conveniently, to be put in a lockable compartment of the scooter. To avoid tampering or theft, the locking block 4 is inserted in the space 21, 210 of the non-removable tubular element 2, 200 so that its check lip 41 slides inside the lengthways groove 23, 230 of the space 21, 210. The locking block 4 is then blocked by releasing, using the key 40, the pin 42 in correspondence with the diametrical through hole 24, 240 of the space 21, 210 of the non-removable tubular element 2, 200.

To release the anti-theft device, the driver performs the above operations in reverse order. Clearly, the first operation is to release with the key 40 the locking block 4, removed from the cylindrical space 21, 210 and put in a suitable place. According to the present invention, the locking block 4 is housed in the removable tubular element 1. For this reason, the removable tubular element 1 has, adjacent to its outer end part 11, a housing and sliding space 16 for the locking block 4 (as shown in FIG. 10/1), limited on the inside by the cylindrical guide 13. In the space 16, there is a lengthways groove 160, which functions as a guide for the check lip 41 of the locking block 4 and a diametrical through hole 161 for the pin 42, which is released by the same locking block. The lengthways groove 160 is longer than the lengthways groove 23, 230 of the space 21, 210 of the non-removable tubular element 2, 200 since the space 21, 210 does not only function as a housing, but also as a sliding area for the locking block 4, which may be useful. In fact, it is recommended, when releasing the anti-theft device according to the present invention, that the locking block 4 is slid inside the space 16 of the removable tubular element 1 because, in this way, the driver uses the push head 35 of the shaped rod 30 to engage and disengage the removable tubular element 1 with the non-removable tubular element 2, 200. When this engagement has been made as described above, the locking block 4 is blocked with the key 40 in the space 16 of the removable tubular element 1.

Continuing the description of the operation for releasing the anti-theft device according to the present invention, to start the scooter, after releasing and removing the locking block 4 from the space 21, 210 of the non-removable tubular element 2, 200, the removable tubular element 1 is inserted in the same space through the fitting sleeve 15 which is forced into the non-removable tubular element 2, 200 by known guide means, such as grooves and lips or similar, not shown in the figures. At this point, the driver, applies, with a finger, axial pressure on the shaped rod 30 using the push head 35, directly or with the locking block 4, before inserting the locking block in the space 16 of the removable tubular element 1. The shaped rod 30 is moved in the direction from the outer end point 11 towards the inner end point 12 until the push head 35 rests against the outer face of the cylindrical guide 13. In this way, the enlarged end 31 passes the first section 26 of the cavity 25. At this point, the twist grip 10 will be turned and then the removable tubular element 1 will be turned, which will cause, after the release of pressure on the rod 30, the enlarged end 31 to be held by the second section 27 of the cavity 25. This ensures a stable connection between the removable tubular element 1 and the non-removable tubular element 2, 200 and then between the twist grip 10 and the flexible transmission means, for starting up the scooter.

According to another embodiment, the anti-theft device for the fuel control twist grip in two parts according to the present invention may be connected to a mechanism that blocks the brake lever in the braking position, which increases the efficiency of the anti-theft device and guarantees, as well as the blocking of the fuel supply, that the scooter cannot be moved. The blocking mechanism for the brake lever, marked with 8, is represented in FIGS. 11 to 16 in two preferred embodiments.

To apply the blocking mechanism, a locking block 400 is used (FIG. 9), slightly modified compared to locking block 4 in FIG. 7. The locking block 400 has a rigid blocking fin 401 around the circumference (and a corresponding fin 402 around the circumference to balance the force), whose use will be explained below, and an end flange 93.

In a first embodiment (FIG. 11), the non-removable tubular element 2, 200 has a through hole for a lever 8 that holds the brake lever 9. For the sake of simplicity, this through hole is shown only with reference to the non-removable tubular element 200 as in FIG. 8, where it is marked with 207. The through hole 207 is aligned with hole 65, on the hollow cylindrical body 6, when the twist grip 10 is in the rest position.

The holding element of the blocking mechanism 8 of a brake lever 9 passes through the through holes 65 and 207, as shown in FIG. 11 and explained in greater detail below.

With reference to FIGS. 11 to 15, the blocking mechanism 8 consists of a U-shaped holding lever 80, fitted and revolving around the centre of the same fulcrum pin 90 of the brake lever 9 of the scooter. The holding lever 80 is made of two opposing U-shaped plates, connected, at the respective free ends, by a terminal part 85, on the long arm 81 of the lever and by the end part 182 of the short arm 82, to encircle the brake lever from both the upper and lower sides of the lever. The terminal part 85, which is at right angles to the brake lever 9, acts as a check plate, exercising pressure on the lever. The end part of the short arm 182, pivots at right angles on a hooking element, in two parts, that is, a pin 83 and a tip 84. The tip 84 has an end flap 184 which can be inserted in the opening 207, for engagement with the fin 401 on the circumference of the locking block 400, inserted and blocked in the cylindrical space 210 of the non-removable tubular element 200.

The pin 83 and the tip 84 can be screwed together in an adjustable manner to ensure the correct insertion of the end flap 184 in the opening 207. In addition, the hooking element 83, 84 has an extension 183 so that the end flap 184 can be inserted manually in the opening 207.

In a second embodiment of the blocking mechanism 8 of the brake lever, shown in FIG. 16 and shown in its operational form in FIGS. 10/1 and 10/3, the brake lever 900 has been modified and has a side extension 901, facing the fuel control twist grip, fitted with a through hole 902 in which a stem 91 is held and rotates. The stem 91 has a ring element at right angles 92, which can be positioned co-axially to the end part of the non-removable tubular element 200, held by the end flange 93 of the locking block 400, used to check and block the ring element 92 when inserting the locking block itself in the space 210 of the non-removable tubular element 200 (FIG. 10/3).

According to a further embodiment, particularly suitable to be applied on motorcycles and illustrated in FIGS. 17 and 18, the anti-theft device for the fuel control twist grip comprises a twist grip 10 mounted on a removable tubular element 501 which cooperates with the fuel supply control device 502. The tubular element 501 is hollow for all its length and consequently can be co-axially fitted on a handlebar 407 whose tube 405 is extending for the complete length of tubular element 501 and internally thereto.

The tubular element 501, on the end next to the fuel supply control device 502, is provided with a plurality of teeth 503 equiangularly positioned along a circumference co-axial to the handlebar 407 and lengthways extending towards the fuel supply control device 502. In the embodiment illustrated in FIGS. 17 and 18 the teeth are four, but they can also a different number in such a way to have the capability of driving the control fuel supply device 502 with a sufficient torque. The fuel supply control device 502 comprises a rotatable element 505 provided with seats 504 which can accommodate and are in a corresponding number to the teeth 503. The rotatable element 505 actuates in conventional manner a flexible transmission cable 517 that in turn actuates, also in conventional manner, the supply of the fuel to the engine of the motorvehicle.

The tubular element 501 comprises also an annular rib 506 which is accommodated in a corresponding annular groove 507 of the rotatable element 505. The rib 506 and the corresponding groove 507 prevent from getting to the seats 504 from the external.

On the side opposed to the fuel supply control device 502, a locking block 508 is mounted on the end of the tube 405 of the handlebar 7. The locking block 508 is releasably coupled to the tube 405 by means of a plurality of pins 509 which engage in a corresponding groove 410 realised internally to the tube 405. In the same way as for the other embodiments, the pins 509 pop out from the locking block 508 when a key 511 is turned. The locking block 508 has also a part 512 that fits into a respective seat 513 realised internally to the tubular element 501. It should be noted that the part 512 has a diameter that is larger than the diameter of the tube 405 of the handlebar 407 so that the twist grip 10 and the respective tubular element 501 are axially fixed but can rotate for the control of the fuel supply.

The anti-theft device according to the present embodiment further comprises a second twist grip 514 mounted on a tubular element 515. The tubular element 515 is substantially identical to the tubular element 501 except for the teeth 503 that are missing. Because of the absence of the teeth 503, the second twist grip 514 and the respective tubular element 515 are a dummy group 516 that cannot drive the fuel supply control device 502 and rotates freely when mounted in place of the grip 10 and the tubular element 501.

In use, the driver, after having stopped and parked the motorvehicle, removes the locking block 508 by rotating the key 511, removes also the grip 10 and the respective tubular element 501, substitutes them with the dummy group 516 and finally replaces the locking block 508 in the tube 405 of the handlebar 407 by rotating again the key 511.

For using the motorvehicle again, it is sufficient removing the dummy group 516 and substituting it with the grip 10 and the respective tubular element 501 in inverse way.

It is evident that the dummy group 516, being without the teeth 503, can rotate freely without driving the fuel supply control device 502. It should be also noted that the rib 506 on the tubular element 515, that is identical to the rib 506 on the tubular element 501, cooperating with the annular groove 507, prevents the access to the seats 504 and therefore it prevents the rotation of the fuel supply control device 502 by tampering. To this purpose, the fuel supply control device 502 should be lengthways fixed to the tube 405 of the handlebar 407 so that it cannot be shifted along the handlebar 407 for getting to the seats 504. For example, the fixation of the fuel supply control device 502 can be obtained in conventionally manner by means of a bolt (not shown) passing through the tube 405 of the handlebar 7. Besides, all the devices related to the control of the supply of the fuel to the engine of the motorvehicle, comprising also the flexible transmission cable 517, should protected by cutting and/or tampering.

In this embodiment, it is particularly important that the tube 405 of the handlebar 407 is integral and continues also in the area where is the twist grip 10, and only very limited modifications to the handlebar are necessary for installing the anti-theft device.

The present invention, thus designed for the said objects, may be subject to numerous modifications and/or variations, all encompassed by the original design concept. Moreover, all components may be replaced with technically equivalent parts.

The invention described can be subject to modifications and variations without thereby departing from the scope of the inventive concept.

What is claimed is:

1. An anti-theft device for scooters, motorvehicles, snowmobiles, outboard motors, helicopters and other motorvehicles provided with a fuel control twist grip, which affects the fuel control twist grip, wherein said twist grip comprises two co-axial consecutive parts, which can be rigidly coupled together, of which the first part is a removable tubular element (1), covered on the outside with an integral grip (10) and the second part is a non-removable tubular element (2; 200), present in the handlebar and engaged with flexible transmission means of the fuel supply control; and engagement means (3) are provided between said removable tubular element (1) and said non-removable tubular element (2; 200) allowing the removable tubular element (1) to be engaged to or released from the non-removable tubular element (2; 200).

2. The anti-theft device according to claim 1, further comprising a locking block (4) for the non-removable tubular element (2; 200) when said removable tubular element (1) has been disengaged and removed.

3. The anti-theft device according to claim 1, wherein said engagement means (3) comprise, inside said removable tubular element (1), a shaped rod (30) having an end (31) which matches with a section (27) of the non-removable tubular element (2; 200).

4. The anti-theft device according to claim 3, wherein said shaped rod (30) comprises:
a push head (35) integral with a non-circular enlarged part (34) which slides in a matching through hole (130) of a cylindrical guide part (13) integral with the inside of said removable tubular element (1);
a cylindrical stem (32), originating from said enlarged part (34) which has, near the enlarged part, an integral crossways stop disk (33), for resting against and pushing an antagonist spring (14); and,
an enlarged end (31) at the end of said cylindrical stem (32) with a non-circular cross section;
wherein said engagement means (3) comprise, on the inside of said non-removable tubular element (2; 200) an integral engagement bushing (22) which has a center through cavity (25) shaped like the first section (26) which matches that of said enlarged end (31) of said rod (30) and guides the enlarged end into a second section (27) forming a holding shoulder for the enlarged end (31), once the enlarged end has passed said first section (26) and has turned by a set angle.

5. The anti-theft device according to claim 4, wherein the removable tubular element (1) comprises a fitting sleeve (15), a part of which (151) is integral on the inside with the end part of said removable tubular element (1), and acts as a check for said antagonist spring (14), and whose extended part (152) is slid into and engaged with the end part of said non-removable tubular element (2; 200); and in that a cylindrical space (21; 210) is defined between said engagement bushing (22) and said end part of the non-removable tubular element (2; 200), which houses said extended part (152) of the fitting sleeve (15) and said locking block (4) for closing the space itself, in the absence of said removable tubular element (1).

6. The anti-theft device according to claim 4, wherein said enlarged end (31) and said enlarged part (34) of the shaped rod (30) have an elliptical cross section.

7. The anti-theft device according to claim 4, wherein the first section (26) of the cavity (25) of the engagement bushing (22) has an elliptical cross section which matches the shape of said enlarged end (31) of the rod (30) and the second section (27) of the same cavity (25) has a cross-shaped section formed by matching elliptical section housings which have symmetry planes at right angles to each other.

8. The anti-theft device according to claim 4, wherein said removable tubular element (1) has, on the inside, a cylindrical space (16) between said push head (35) and an outer end part (11) of the removable tubular element (1) which houses said locking block (4) of the same space, when said removable tubular element (1) is engaged in said non-removable tubular element (2; 200).

9. The anti-theft device according to claim 4, wherein said cylindrical space (21; 210) of the non-removable tubular element (2; 200) has a lengthways guide groove (23; 230) for a check lip (41) of said locking block element (4) and a diametrical through hole (24; 240) for a pin (42) released by said locking block element.

10. The anti-theft device according to claim 8, wherein said cylindrical space (16) of the removable tubular element (1) has a lengthways groove (160) for a check lip (41) of said locking block element (4) and a diametrical through hole (161) for a pin (42) released by the locking block element.

11. The anti-theft device according to claim 1, wherein said non-removable tubular element (2) is housed in and can be turned within a handlebar body (5) and has, at the opposite end of said cylindrical space, splined onto said non-removable tubular element, a sheave (20) for fuel control flexible transmission cable.

12. The anti-theft device according to claim 3, wherein said non-removable tubular element (200) is housed and revolves co-axially in a hollow cylindrical body (6), firmly connected to an end part of the handlebar tube (7) by coupling means (61, 62, 63) and fitted on the outside with a lengthways prismatic guide (64); said non-removable tubular element (200) has a spiral groove (202) for sliding a slider (203) connected to the end part of the flexible transmission cable (204) of the fuel control and which moves in the same lengthways guide (64) of the hollow cylindrical body (6).

13. The anti-theft device according to claim 3, wherein said non-removable tubular element (2; 200) is fitted with a mechanism (8) for blocking a brake lever (9) in a braking position.

14. The anti-theft device according to claim 13, wherein said blocking mechanism (8) includes a U-shaped holding lever (80), fitted and revolving around the center of a fulcrum pin (90) of the scooter brake lever (9), by encircling the brake lever from both the upper and lower sides of the lever and which has a long arm (81) which has at a free end of said long arm a terminal part (85) at right angles to the brake lever (9) for checking and applying pressure to the brake lever, and a short arm (82), the end of which (182) pivots at right angles on a hooking element (83, 84), which has an end flap (184) which can be inserted in a through hole (207) in said non-removable tubular element (2; 200) for engagement with a fin (401) on the circumference of a locking block (400), inserted and blocked in said cylindrical space (21; 210) of the non-removable tubular element (2; 200).

15. The anti-theft device according to claim 14, wherein said hooking element (83, 84) is made in two parts and can be screwed together in an adjustable manner to ensure the correct insertion of the end flap (184) in said opening (207).

16. The anti-theft device according to claim 14, wherein said hooking element (83, 84) has an extension (183) for manual insertion of said end flap (184) in said opening (207).

17. The anti-theft device according to claim 13, wherein said blocking mechanism (8) includes a brake lever (900)

which has a side extension (901), facing said fuel control twist grip (1), which has a through hole (902), in which a stem (91) is held and rotates; the stem (91) has a right angle ring element (92), which can be positioned co-axially to the end part of said non-removable tubular element (2; 200) and which includes a locking block (400) which has an end flange (93) used to check and block said ring element (92) when the locking block itself is inserted in said space (21; 210) of the non-removable tubular element (2; 200).

18. The anti-theft device according to claim 12, wherein said lengthways guide (64) and relative flexible transmission are protected by a cover (100) which is fixed with the relative counter-plate to said hollow cylindrical body (6) and relative end part of the handlebar tube (7).

19. An anti-theft device for scooters, motorvehicles, snowmobiles, outboard motors, helicopters and other motor-vehicles provided with a fuel control twist grip, which affects the fuel control twist grip, said anti-theft device comprising:

a removable tubular element (501), covered on the outside with an integral grip (10), the tubular element (501) being hollow and being fit on a tube (405) of a handlebar (407);

a non-removable fuel supply control device (502), fixed on the handlebar (407) and engaged with transmission means (505, 517) for the fuel supply control to the engine of the motorvehicle; and, first engagement means (503) provided on said removable tubular element (501) and second engagement means (504) provided on said non-removable fuel supply control device (502), the first and the second engagement means being operatively associable.

20. The anti-theft device according to claim 19, further comprising:

a locking block (508) for the removable tubular element (501) associated to the tube (405) of the handlebar (407), so that said removable tubular element (501) can be disengaged and removed; and, a second tubular element (515), covered on the outside with an integral grip (514) and missing of the engagement means (503), said second tubular element (515) replacing said first tubular element (501) when the anti-theft device is in use, so that the tubular element (515) can freely rotate without affecting the fuel supply control to the engine of the motorvehicle.

21. The anti-theft device according to claim 19, wherein said first engagement means are embodied by a plurality of teeth (503) equiangularly positioned along a circumference co-axial to the handlebar (407) and the second engagement means are embodied by a plurality of seats (504) so shaped which can accommodate said teeth (503).

22. The anti-theft device according to claim 20, wherein the tubular element (501) and the second tubular element (515) comprise an annular rib (506) which is accommodated in a corresponding annular groove (507) realised in the transmission means (505) of the fuel supply control device (502), whereby the rib (506) and the corresponding groove (507) prevent access to the seats (504) from the external.

23. The anti-theft device according to claim 2, wherein said engagement means (3) comprise, inside said removable tubular element (1), a shaped rod (30) having an end (31) which matches with a section (27) of the non-removable tubular element (2; 200).

24. The anti-theft device according to claim 5, wherein the first section (26) of the cavity (25) of the engagement bushing (22) has an elliptical cross section which matches the shape of said enlarged end (31) of the rod (30) and the second section (27) of the cavity (25) has a cross-shaped section formed by matching elliptical section housings which have symmetry planes at right angles to each other.

\* \* \* \* \*